United States Patent
Dahlberg

[11] Patent Number: 6,086,260
[45] Date of Patent: Jul. 11, 2000

[54] CRANKSHAFT BEARING SYSTEM

[75] Inventor: Göran Dahlberg, Gränna, Sweden

[73] Assignee: Aktiebolaget Electrolux, Stockhlom, Sweden

[21] Appl. No.: 09/180,590

[22] PCT Filed: May 29, 1997

[86] PCT No.: PCT/SE97/00926

§ 371 Date: Nov. 12, 1998

§ 102(e) Date: Nov. 12, 1998

[87] PCT Pub. No.: WO97/45649

PCT Pub. Date: Dec. 4, 1997

[30] Foreign Application Priority Data

May 31, 1996 [SE] Sweden .................................. 9602195

[51] Int. Cl.[7] .................................. F16C 33/66; F02F 7/00
[52] U.S. Cl. ...................... 384/457; 384/462; 123/195 R
[58] Field of Search .................................. 384/457, 477, 384/484, 462, 473, 474, 475; 123/195 R

[56] References Cited

U.S. PATENT DOCUMENTS

| 3,149,890 | 9/1964 | Selby | 384/473 |
| 3,195,965 | 7/1965 | Van Dorn | 384/475 |
| 4,429,924 | 2/1984 | Franz et al. | 384/462 |
| 4,968,157 | 11/1990 | Chiba | 384/462 |
| 5,441,019 | 8/1995 | Sayer et al. | 384/457 |

FOREIGN PATENT DOCUMENTS

| 339631 | 11/1989 | European Pat. Off. . |
| 2161738 | 6/1973 | Germany . |
| 500270 | 5/1994 | Sweden . |
| 365250 | 12/1962 | Switzerland . |

*Primary Examiner*—Thomas R. Hannon
*Attorney, Agent, or Firm*—Pearne & Gordon LLP

[57] ABSTRACT

The subject invention refers to a crankshaft bearing system (1) for an internal combustion engine, in which the engine's crankshaft (15) is mounted in permanently lubricated sealed bearings (2, 3), usually ball bearings (2, 3), and the engine's crankcase seals (4, 5) are located inside each bearing (2, 3), i.e. between the bearing (2, 3) and the crankshaft assembly (6) with piston rod (7) and counterweights (8, 9), and a draining duct (11) is arranged in the crankshaft so that it leads from a space (12) between one of the crankcase seals (4, 5) and adjacent bearing out to the surrounding air.

16 Claims, 1 Drawing Sheet

CRANKSHAFT BEARING SYSTEM

TECHNICAL FIELD

The subject invention refers to a crankshaft bearing system for an internal combustion engine.

BACKGROUND OF THE INVENTION

According to tradition internal combustion engines have crankshaft bearings, which are lubricated from the crankcase, for instance by oil-splash lubrication. Regarding crankcase scavenged engines the bearings are usually lubricated by the fuel-oil-mixture in the crankcase. The crankcase seals are located outside the bearings. This means that the bearings are subjected to dirt and residual combustion deposits which could shorten the lifetime. Also, the design of the bearings can affect the crankshaft's mechanical stability regarding bending vibrations. High-speed engines, such as two-stroke engines for chainsaws etc., can achieve, in point of bending vibrations, a critical range of speed. Regarding crankcase scavenged engines also the crankcase compression is affected by the design of the bearings and seals, and consequently the engine power.

PURPOSE OF THE INVENTION

The purpose of the subject invention is to substantially reduce the above outlined problems, and to achieve advantages in many respects.

SUMMARY OF THE INVENTION

The above mentioned purpose is achieved in that the crankshaft bearing system in accordance with the invention having the characteristics appearing from the appended claims.

The crankshaft bearing system in accordance with the invention is thus essentially characterized in that the engine's crankshaft is mounted in permanentely lubricated sealed bearings, usually ball bearings, and in that the engine's crankcase. seals are located inside each bearing, i.e. between the bearing and the crankshaft assembly with piston rod and counterweights. On a conventional crankshaft the seals are instead located outside each bearing. The new location inside the bearing results in many advantages. The crankshaft becomes stiffer and its harmonic frequency of bending will increase, and in this manner comes more far away from the range of engine speed. The crankcase compression will increase. The bearings are sealed and permanentely lubricated, usually by grease lubrication. Hereby the bearings will not be subjected to dirt or combustion deposits, which could shorten the lifetime. Owing to this the lifetime will be longer, and/or smaller and lighter bearings can be used. These and other characteristic features and advantages of the invention Will become more apparent from the following detailed description of various embodiments with the support of the annexed drawing.

BRIEF DESCRIPTION OF THE DRAWINGS

The invention will be described in closer detail in the following by way of various embodiments thereof with reference to the accompanying drawing, in which the same numbers in the different figures state one another's corresponding parts.

In FIG. 1 numeral 1 designates a crankshaft bearing system or a crankshaft arrangement in accordance with the invention. A crankshaft 15 is mounted in two roller bearings 2, 3, usually ball bearings. The engine's crankcase seals 4, 5 are located inside each bearing 2, 3, i.e. between the bearing and the crankshaft assembly 6 with piston rod 7 and counterweights 8, 9. The design of the crankshaft assembly is entirely conventional and will therefore not be further described.

FIG. 2 shows a partial enlargement of the crankshaft 15 and the bearing 2. As appears from the figure the bearing 2 is externally enclosed in a bearing holder 10. The bearing holder 10 comprises two parts, one inner solid part 16 and one outer elastic part 17. The solid part 16 is usually composed of a metallic part, usually a stamped tin cup. It has an inner diameter of a size adapted to give a suitable grip towards the bearing 2. The solid part 16 also goes down along the side of the bearing. This is advantageous considering the fastening and localization of the seal 4. In this case the seal 4 and the elastic part 17 are integrated into one part, but they could also be composed of two separate parts, each part to be mounted to the solid part 16. The elastic part 17 could for instance be composed of a coating along the outer periphery of the solid part 16. The purpose with the solid part is, on the one hand to achieve an elastic mounting of the bearings, and on the other hand to achieve a sealing around the periphery of the bearings. By the elastic mounting of the bearings a more quiet engine operation can be achieved and consequently less vibrations and noise. Furthermore tolerances and irregularities will be taken care of. The bearing holder 10 can be mounted either directly into each crankcase side or into an intermediate sleeve.

In reality this sleeve is just a metal cover to be used in certain applications.

Figure 1:
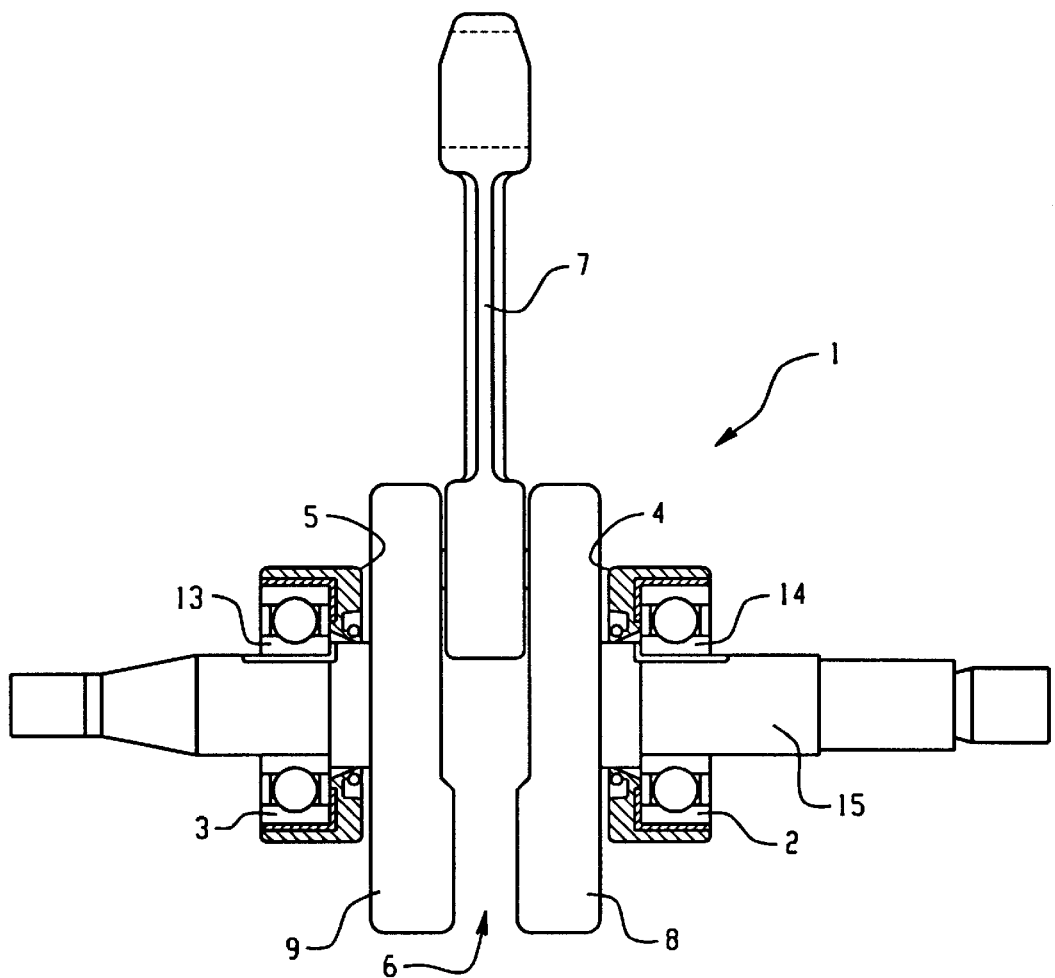
FIG. 1 illustrates schematically a crankshaft bearing in accordance with the invention seen from the side.
Figure 2:
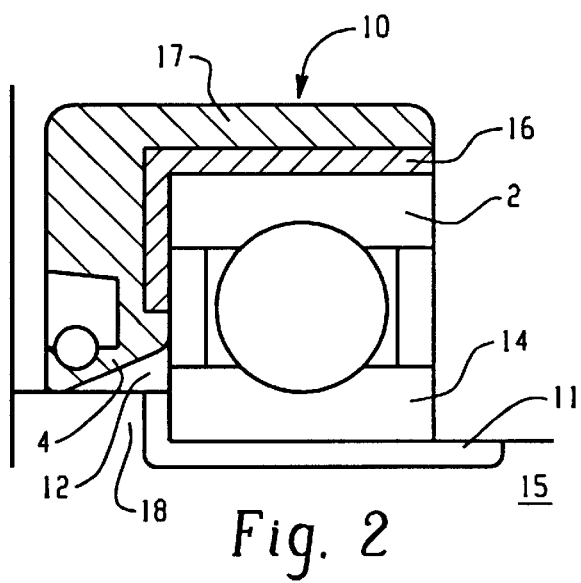
FIG. 2 illustrates enlarged a part of the crankshaft, according to FIG. 1, with bearing and crankshaft seal as well as a draining duct.

As appears from the FIGS. 1 and 2 the bearing is pressed on the crankshaft 15 against a shoulder 18 on the shaft. Consequently, the shaft's diameter is larger than the bearing's inner diameter inside each bearing 2, 3, i.e. between the bearing and the crankshaft assembly. In the shown cross-sectional view in FIG. 2 a draining duct 11 extends through the shoulder 18 and under the bearing. The draining duct 11 is thus embodied as a depression in the crankshaft surface, said depression extends under the inner ring 13, 14 of the bearing, so that the draining duct debouches on each side of the inner ring. Owing to this the seals of the sealed ball bearing or roller bearing will not be subjected to pressure, which they normally don't tolerate. The draining duct 11 is thus so arranged that it leads from a space 12 between one of the crankcase gaskets 4, 5 and the adjacent bearing out to the surrounding air. The draining duct could also be embodied in the solid part 16 or in the elastic part 17, so that communication with the surrounding air could be created along the outside of the bearing instead of along its inside. This could be relevant especially regarding multi-cylinder engines. In this case draining ducts, from both sides of the bearing, could be drained through ajoining duct in the crankcase. However, the draining duct could also be composed of a radial hole in the crankshaft, said hole meets with an axially extending centre hole in the crankshaft. The radial hole can be in contact with the surrounding air, either through another radial hole, or otherwise the centre hole could extend all the way out to the end of the crankshaft. This solution can also be applicable for multi-cylinder engines. However, normally the invention is of greatest advantage for a one-cylinder engine. Especially for a crankcase scavenged engine the invention means a great deal of advantages. Such an engine has a lubricating system independent of position and handling, and is normally therefore used for portable working tools, such as chain saws.

Thus, the most characteristic feature of the invention is that each seal 4, 5 respectively is located inside its respective one of bearing 2, 3, which is permanentely lubricated. In comparison with a conventional crankshaft bearing system, where the gasket is located outside the bearing, which is not sealed and permanenetly lubricated, this means a lot of advantages. Firstly it means that the bearings 2, 3 respectively are located more far out from the crankshaft assembly 6. Hereby the bearing base has increased and the overhang at each shaft end has been reduced. Heavy details such as flywheel and clutch are located at each shaft end. The widening of the bearing base means that the crankshaft's bending out is reduced and its bending harmonic frequency is increased, which is very positive. For, a problem is that these kind of engines are very easily-speeded and under certain conditions they can therefore achieve this critical speed. This is particularly true for two stroke engines. The shoulder 18 contributes to a stiffer shaft. Since each bearing 2, 3 is located more far away from the crankshaft assembly 6, the thicker part with shoulders 18 will extend further towards the shaft ends of the crankshaft 15. Like the widening of the bearing base this contributes to a stiffer crankshaft. By these both cooperating stiffening factors also a comparatively small transfer of each bearing can provide a great stiffening effect, and thereby an utterly desirable increase of the range of speed where the bending resonance arises. Operation in this range of speed will soon result in engine troubles. If the speed range is moved to a higher level, i.e. with a larger speed margin in relation to the engine's normal running speed, running in this critical range can be eliminated or essentially reduced.

Furthermore this crankshaft bearing system means that the crankcase volume will be reduced due to the fact that the air volume in the bearings is eliminated. This is of course due to the fact that the seals 4, 5 are located inside the bearings instead of outside. The reduced crankcase volume means that the crankcase compression will increase. This results in a more effective crankcase scavenging which is advantageous regarding emissions etc. In case the invention is used in combination with other measures taken in order to increase the crankcase compression, this effect will be particularly large. One such step to increase the crankcase compression is to provide the counterweights 8, 9, i.e. the so called balances, with filling material of low density, so that as large part of the crankcase volume as possible will be filled out. Normally the counterweights 8, 9 have not that kind of filling material. The fillings are designed so that each part 8, 9 is included in a circular top-filled disc. The invention can also be used for an engine with an single-side journalled crankshaft, i.e. a crankshaft journalled only on one side of the crankshaft assembly. Naturally, what has been mentioned above, is also applicable to the bearing located most adjacent the crankshaft assembly and its related seal.

What is claimed is:

1. A crankshaft bearing system (1) for an internal combustion engine, wherein a crankshaft (15) is mounted in single-dose lubricated roller bearings (2, 3) and crankcase gaskets (4, 5) are located inside each bearing (2, 3), said gaskets being between the bearing (2, 3) and the crankshaft assembly (6) with piston rod (7) and counterweights (8, 9), wherein one draining duct (11) is arranged in the crankshaft so that said duct leads from a space (12) between one of the crankcase seals (4, 5) and adjacent bearing out to the surrounding air.

2. A crankshaft bearing system (1) in accordance with claim 1, wherein a diameter of the crankshaft (15) is larger than an inner diameter of each bearing (2, 3).

3. A crankshaft bearing system (1) in accordance with claim 1, wherein the internal combustion engine is a one-cylinder engine.

4. A crankshaft bearing system (1) in accordance with claim 1, wherein the internal combustion engine is a crankcase scavenged engine intended for portable working tools.

5. A crankshaft bearing system (1) according to claim 1, wherein at least one of the bearings (2, 3) is externally enclosed in a bearing holder (10).

6. A crankshaft bearing system (1) in accordance with claim 5, wherein a diameter of the crankshaft (15) is larger than an inner diameter of each bearing (2, 3).

7. A crankshaft bearing system (1) in accordance with claim 5, wherein the internal combustion engine is a one-cylinder engine.

8. A crankshaft bearing system (1) in accordance with claim 5, wherein the internal combustion engine is a crankcase scavenged engine intended for portable working tools.

9. A crankshaft bearing system (1) according to claim 5, wherein at least one of the crankcase seals (4, 5) is mounted into, or integrated with the bearing holder.

10. A crankshaft bearing system (1) in accordance with claim 9, wherein a diameter of the crankshaft (15) is larger than an inner diameter of each bearing (2, 3).

11. A crankshaft bearing system (1) in accordance with claim 9, wherein the internal combustion engine is a one-cylinder engine.

12. A crankshaft bearing system (1) in accordance with claim 9, wherein the internal combustion engine is a crankcase scavenged engine intended for portable working tools.

13. A crankshaft bearing system (1) according to claim 9, wherein the draining duct (11) is a depression (11) in a surface of the crankshaft (15), said depression extends under an inner ring (13, 14) of the bearing (2, 3), so that it debouches on each side of the inner ring (13, 14).

14. A crankshaft bearing system (1) in accordance with claim 13, wherein a diameter of the crankshaft (15) is larger than an inner diameter of each bearing (2, 3).

15. A crankshaft bearing system (1) in accordance with claim 13, wherein the internal combustion engine is a one-cylinder engine.

16. A crankshaft bearing system (1) in accordance with claim 13, wherein the internal combustion engine is a crankcase scavenged engine intended for portable working tools.

* * * * *